United States Patent [19]
Lücke

[11] Patent Number: 5,247,051
[45] Date of Patent: Sep. 21, 1993

[54] HOT MELT ADHESIVE BASED ON POLYARYLENE ETHER KETONES AND ITS USE

[75] Inventor: Andreas Lücke, Waldbrunn, Fed. Rep. of Germany

[73] Assignee: Hoechst Aktiengesellschaft, Frankfurt, Fed. Rep. of Germany

[21] Appl. No.: 757,544

[22] Filed: Sep. 11, 1991

[30] Foreign Application Priority Data

Sep. 13, 1990 [DE] Fed. Rep. of Germany ....... 4029069

[51] Int. Cl.$^5$ .......................... C08G 8/02; C08G 14/00
[52] U.S. Cl. ..................... 528/125; 528/126; 528/128; 528/194; 528/219
[58] Field of Search ............... 528/125, 126, 128, 194, 528/219

[56] References Cited

U.S. PATENT DOCUMENTS 3,516,966  6/1970  Berr ..................................... 528/194
4,616,056 10/1986  Chan et al. .......................... 528/125
4,908,425  3/1990  Robeson et al. ..................... 528/125

OTHER PUBLICATIONS

Derwent Report 36609 E/18.

Primary Examiner—John Kight, III
Assistant Examiner—Shelley A. Dodson
Attorney, Agent, or Firm—Connolly and Hutz

[57] ABSTRACT

Hot melt adhesive based on a polyarylene ether ketone of the formula $$-[-O-Ar(-L-Ar)_x-O-Ar-CO-(-Ar-M-)_y-Ar-]- \quad (I)$$

for which the ether/ketone ratio is between 0.5 and 2 and the melt flowability MVI (400/10 min) is 2 to 250. These hot melt adhesives facilitate adhesive bonds, which are resistant to high temperatures, at composites composed of metallic, ceramic and/or polymer substrates which have very good shear strengths.

12 Claims, 1 Drawing Sheet

INFLUENCE OF THE TEST TEMPERATURE ON THE RESISTANCE OF VARIOUS METAL/METAL-BONDINGS
(ADHESIVE : PEEKK ACCORDING TO EXAMPLE 1)

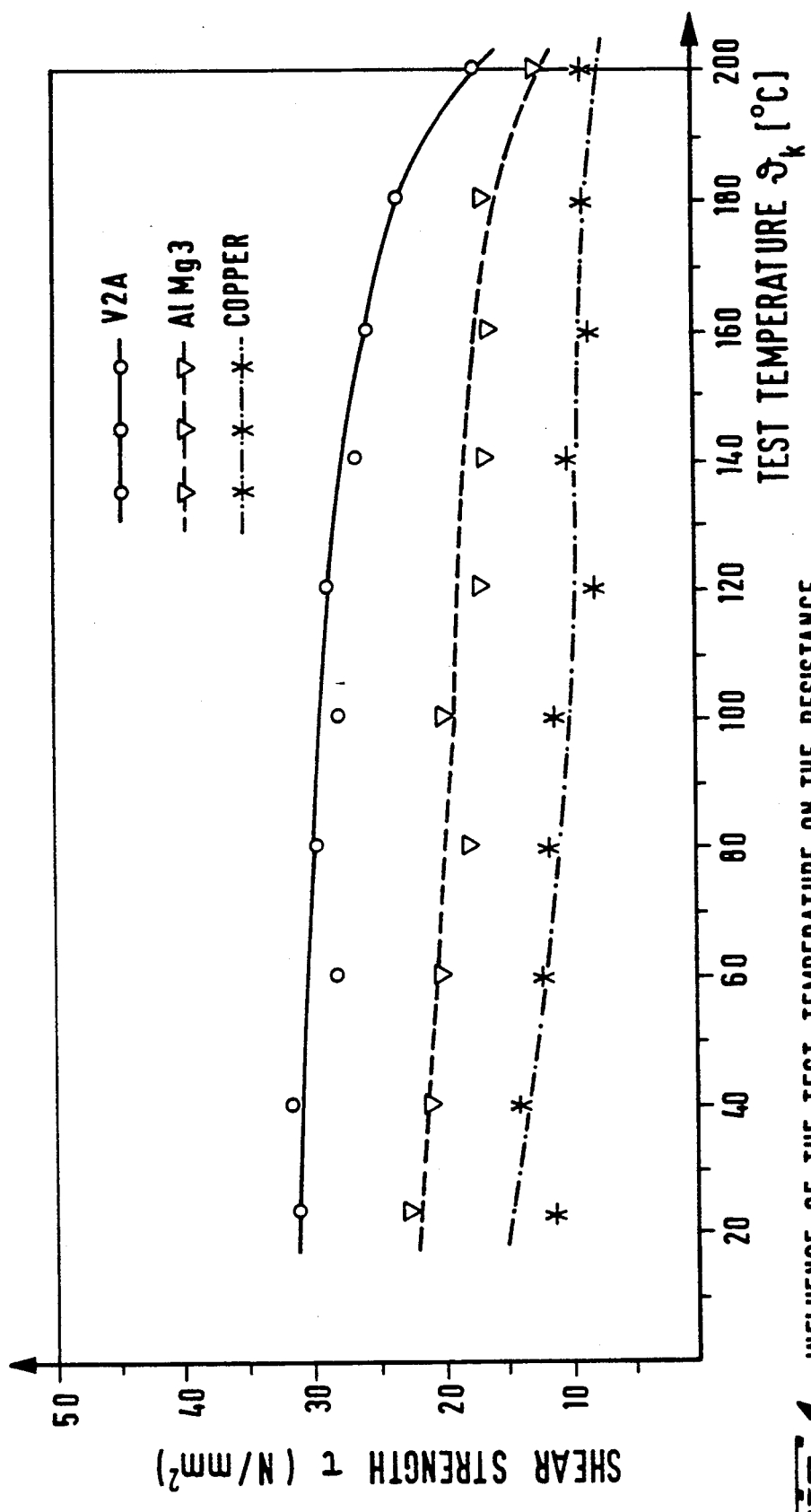
Fig. 1 INFLUENCE OF THE TEST TEMPERATURE ON THE RESISTANCE OF VARIOUS METAL/METAL-BONDINGS (ADHESIVE: PEEKK ACCORDING TO EXAMPLE 1)

HOT MELT ADHESIVE BASED ON POLYARYLENE ETHER KETONES AND ITS USE

DESCRIPTION

The invention relates to hot melt adhesives based on polyarylene ether ketones (PAEK), the ether/ketone ratio of which is less than 2, and their use for bonding metal, plastic, glass and ceramic parts.

Hot melt adhesives are adhesives which are melted and which set by physical means on cooling. The cooling process proceeds very rapidly, so that the bond can already be placed under load after a short time.

The possibility of producing a hot melt adhesive bond between metals using a polyarylene ether ketone having the PEEK (polyether ether ketone) structure which has an ether/ketone ratio of 2:1 in the polymer chain sequence has already been indicated in the literature (Derwent Report 36609E/18). However, the resulting adhesive bonds are not entirely satisfactory in respect of heat resistance.

The use of sulfur-containing polyarylene ether ketones as hot melt adhesive has also been disclosed (U.S. Pat. No. 4,616,056). In these mixtures the sulfur is intimately mixed with the polyarylene ether ketone and is in the form of elemental sulfur, inorganic sulfides or organic sulfur compounds. As a result of the post-curing at high temperature, crosslinking takes place, as a result of which the improved characteristic values are obtained. Polyarylene ether ketones without the addition of sulfur are designated as unsuitable for use as hot melt adhesives in this prior art. During the crosslinking brought about the sulfur an embrittlement of the adhesive must be expected, and thus an adverse lower fatigue strength.

The good adhesion of copolyketones having the PEEK structure to metal is known (U.S. Pat. No. 3,516,966). However, polyketones on this basis present difficulties in respect of thermal decomposition at the processing temperatures and use as hot melt adhesives is therefore precluded.

It was therefore desirable to have available a non-crosslinked hot melt adhesive which facilitates adhesive bonds which are resistant to high temperatures and are stable at up to 200° C. and which, because of its strength at high temperatures, can be used, for example, in the vehicle engine sector and in aircraft construction.

This object has been achieved by the use of specific polyarylene ether ketones having a lower ratio of ether to ketone units than 2:1, for example, PEK, PEEKK and PEKEKK. The invention therefore relates to a hot melt adhesive based on a polyarylene ether ketone of the formula

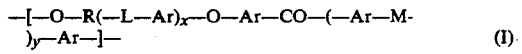
(I)

in which Ar is an aromatic group and, in each case independently of one another, is a phenylene, diphenyl or naphthylene group, L or M is in each case —O— or —CO— and x and y independently of one another are zero or 1, 2, 3 or 4, the ether/ketone ratio is between the values 0.5 and 2 and is preferably 0.66 to 1 and the melt flowability (MVI 400/10 min) is 2 to 250.

The suitable polyarylene ether ketones preferably have melt volume indices MVI (400/10 min) of 2 to 100.

Adhesive bonds produced using PEK, PEEKK and PEKEKK as preferred hot melt adhesives not only have better heat resistance but also have higher shear strength values than the polyarylene ether ketone containing recurring units of the formula PEEK. They are also far superior to commercially available adhesives and hot melt adhesives synthesized on a different basis. The polyarylene ether ketones having the PEEKK or PEKEKK structure are particularly preferred.

Polyarylene ether ketone are partially crystalline thermoplastics of outstanding heat resistance. Polymers of this type have glass transition temperatures of above 130° C. and melting points of between 330° and 400° C. The suitable polyarylene ether ketones according to the invention in general have glass transition temperatures of above 150° C. and preferably of above 155° C. Their high thermal transition temperatures are the reason for the high heat distortion resistances of these materials. By virtue of their chemical and morphological structure, polyarylene ether ketones have considerable advantages compared with polyimides, which can achieve even high heat distortion resistances, they have the advantage, which is decisive for the processor, that they are moldable from the melt.

Compared with the amorphous high-temperature polymers, such as polyether sulfones or polyether imides, the partially crystalline polyarylene ether ketones have the advantage of higher mechanical strength, pronounced resistance to cracking in solvents and very good resistance to chemicals. The combination of these properties permits the use of polyarylene ether ketones in engine and machine construction.

The ether/ketone ratio plays a decisive role in the heat distortion resistance of polymers of the polyarylene ether ketone group. Adhesive bonds which are produced using PEK, PEEKK and PEKEKK as hot melt adhesives are able to withstand temperatures about 20 degrees high than those which have been produced using PEEK. The values of the glass transition temperatures, which determine the heat distortion resistances, are compared in Table 2.

Polyarylene ether ketones having an ether/ketone ratio of less than 2 are therefore suitable for the production of heat-resistant adhesive bonds. The becomes clear on comparison of PEEK with PEEKK: compared with PEEK—corresponding to the prior art—PEEKK has the advantage that its heat distortion temperature is increased by about 20K.

The polyarylene ether ketones can be used not only on their own but also as mixtures. Copolyether ketones, which are composed of two or more recurring EK, EEKK, EKEKK and EKK units, are also suitable, arbitrary combinations being possible.

Polyarylene ether ketones in which not more than 5 mol% of the ether groups have been replaced by thioether groups and which are thus not subject to crosslinking are also suitable as hot melt adhesive according to the invention.

The hot melt adhesive can be used in the form of powder, granules, films and fibers. The particle size of the hot melt adhesive has a slight influence on the strength of the bond; a powder having an average particle size of 20 μm (d$_{50}$ value) is preferred.

The hot melt adhesive can contain conventional fillers and/or reinforcing materials in amounts such that they do not impair the adhesive characteristics.

The preparation of a polyarylene ether ketone to be used according to the invention, for example PEEKK, can be carried out in a known manner, for example in accordance with EP-B 0 143 407 by a nucleophilic condensation reaction from hydroquinone and 1,4-bis(4'-chlorobenzoyl)benzene or 1,4-bis(4'-fluorobenzoyl)benzene. The polyarylene ether ketone has an inherent viscosity of at least 0.5, preferably 0.7 to 1.5 and in particular 0.8 to 1.2.

A further possiblity for the preparation of polyarylene ether ketones of the formula (I) comprises the Friedel-Crafts reaction of diacyl halides with aromatic compounds containing at least two hydrogen atoms, in the presence of a catalyst. (German Offenlegungsschrift 16 45 153, U.S. Pat. No. 3,953,400 and U.S. Pat. No. 3,956,240). Typical starting materials for the preparation of the polyarylene ether ketones by means of Friedel-Craft acylation are terephthaloyl chloride or phosgene and diphenyl ether, and optionally diphenoxybiphenyl, diphenoxybenzene or p-phenoxybenzoyl chloride.

The hot melt adhesive according to the invention can be used to produce composites from metallic, ceramic and polymer materials, such as steel, aluminum, copper, ceramic, glass and/or plastic. The composite of steel sheets, and also steel/ceramic sheets, is preferred.

EXAMPLES 1) 7.709 kg of hydroquinone, 15.3 kg of sodium hydrogen carbonate and 70 kg of diphenyl sulfone were placed in a stirred vessel. The air was driven off by nitrogen and the mixture heated to 140° C. The mixture was then stirred at 140°–150° C. and after the evolution of gas had subsided was heated to 210° C. 22.45 kg of 1,4-bis(4'-fluorobenzoyl)benzene (BFB) were added. The temperature was raised to 310° C. in the course of one hour. After a further 20 minutes, the reaction mixture was cooled, comminuted and washed alternatively with water and sulfuric acid and with acetone in order to remove salts and diphenyl sulfone. The polymer powder was dried at 120° C./100 mbar. The average particle size of the polymer obtained was 700 μm, the inherent viscosity (IV) of the polymer powder, measured in accordance with DIN 53 735 at 25° C. in concentrated sulfuric acid, was 1.1 and the MVI (400/10 min)=15.

2) The strips of sheet steel (®V2A), PEEKK,, aluminum and copper used in the adhesion tests each had the following dimensions: length 100 mm, width 25 mm and height 1.5 mm.

An adhesion test, on 5 samples in each case, was carried out using strips of sheet steel (V2A), the bond surfaces of which had been sanded with a grade 80 paper. The two parts for bonding were heated on a heating element. The temperature of the heating element were adjusted using a control. For reasons of the more rapid melting, an adhesion temperature of $T_1 450°$ C. was chosen for production of the adhesion with the PEEKK powder. After this temperature was reached, the PEEKK powder from Example 1 was sprinkled on one bond surface and plasticized. The second steel sheet was fixed thereon with an overlap length ($l_o$) of 10 mm and placed under load. Initially the upper part for bonding was moved against the lower, in order to obtain optimum wetting. The test piece was then removed from the heating element and cooled under constant load until the melt solidified. The tensile test was carried out, in accordance with DIN 53, 282, two hours after the start of adhesion. The shear strength was 26.96 N/mm$^2$.

3a) Example 2 was repeated using a PEEKK powder having a MVI of 27, the particles of which had been ground to an average particle size of 20 μm. The shear strength was 35.81 N/mm$^2$.

3b) As a modification of Example 3a, the two steel plates were heated and each sprinkled with powder having an average particle size of 20 μm and after plastification of the hot melt adhesive the plates were bonded together. The shear strength was 40.2 N/mm$^2$ (average value from 3 tests).

4) The pair of parts for bonding was steel/steel as in Example 2, but granules were prepared from the PEEKK powder obtained in Example 1 and these granules were used as hot melt adhesive having an average particle size of 3000 μm. The shear strength was 30.28 N/mm$^2$.

5) Example 2 was repeated using a PEEKK powder having a MVI of 6, ground to an average particle size of 60 μm. The shear strength was 32.96 N/mm$^2$.

6) The influence of the particle size and of the melt flowability using PEEKK as hot melt adhesive for the steel/steel pair of parts for bonding can be seen from Table 1.

TABLE 1

| Hot melt adhesive | Particle size | MVI | Shear strength |
|---|---|---|---|
| PEEKK powder | 20 μm | 27 | 35.81 N/mm$^2$ |
| PEEKK powder | 60 μm | 26 | 30.65 N/mm$^2$ |
| PEEKK powder | 60 μm | 6 | 32.96 N/mm$^2$ |
| PEEKK granules | 3000 μm | 15 | 30.28 N/mm$^2$ |

The values are average values from 5 measurements in each case. It can be seen from the results that in the case of the steel/steel pairing of parts for bonding the powder having the finer particle size can produce higher shear strengths. Comparison of the hot melt adhesive having the same particle size but different flowability of the hot melt adhesive shows no clear influence on the shear strength.

7) The shear strengths of adhesive bonds of polyarylene ether ketones having a E/K ratio of less than 2 are compared with PEEKK in Table 2. The adhesion tests were carried out analogously to example 2; adhesion temperature ($T_a$) 380° C. in each case (adhesion bonds of overlapping steel strip samples. Overlap length l = 10 mm, measured at 23° C. in accordance with DIN 53 283). The shear strength values indicated are average values from 5 tests in each case.

TABLE 2

| Comparison of the shear strengths of various adhesives: | | | |
|---|---|---|---|
| Hot melt adhesives [PAEK block] | Melting point [°C.] | Glass transition temperature ** [Tg] | Shear strength [N/mm$^2$] |
| PEK *) | 373 | 162 | 26.80 |
| PEEKK from Ex. 4 | 365 | 160 | 30.28 |
| PEKEKK *) | 381 | — | 34.07 |
| PEEK *) (comparison) | 334 | 143 | 20.03 |

*) The samples are commercially available products and were used in the form supplied.
** Literature data from the manufacturer It can be seen from the results that hot melt adhesives based on PEEKK, PEK and PEKEKK produce firmer adhesive bonds than a hot melt adhesive based on PEEK and still give firm bonds even at elevated temperatures.

8) A steel platelet (V2A) and a plastic platelet of PEEKK, which is reinforced with 30% glass fibers, were stuck together using PEEKK granule particles having an average particle size of 3000 μm. The average value of the shear strength was 16.16 N/mm².

9) Two aluminum platelets (so-called AlMg₃ alloy) were stuck together by the method described in Example 2 using the PEEKK powder having an average particle size of 700 μm. The average value of the shear strength was 11.76 N/mm².

10) Example 9 was repeated except that the finely ground powder having an average particle size of 20 μm from Example 3 was used. The shear strength was 25.31 N/mm².

11) Example 9 was repeated using the powder obtained in Example 1, from which granules were first prepared and these granules were then extruded to give a film. A piece of film 250 μm thick served as hot melt adhesive. The shear strength was 16.31 N/mm².

12) An aluminum platelet (so-called AlMg₃ alloy) and a plastic platelet made of glass fiber-reinforced PEEKK as in Example 6 were stuck together using the PEEKK powder having an average particle size of 700 μm. The average value of the shear strength was 12.32 N/mm².

13) Example 12 was repeated using PEEK granules having an average particle size of 300 μm on the shear strength was 12.06 N/mm².

14) Two copper platelets were stuck together by the method described in Example 2 using the PEEKK powder having an average particle size of 700 μm. The average value of the shear strength was 7.64 N/mm².

15) Example 14 was repeated, but the finely ground powder having an average particle size of 20 μm according to Example 3 was used as hot melt adhesive. The shear strength was 15.63 N/mm².

16) Example 14 was repeated using the granules having an average particle size of 3000 μm from Example 4. The shear strength was 12.29 N/mm².

17) Example 14 was repeated except that the film from Example 11 was used as hot melt adhesive. The shear strength was 14.34 N/mm².

18) A copper platelet and a plastic platelet of glass fiber-reinforced PEEKK, as in Example 8, were stuck together using the PEEKK powder having an average particle size of 700 μm obtained in Example 1. The average value of the shear strength was 10.74 N/mm².

19) A steel sheet (V2A) and a small ceramic clump having dimensions of 20×20×4.5 mm (HIP RBSN ceramic from Hoechst-CeramTec, Selb, Federal Republic of Germany) were stuck together using the PEEKK powder having an average particle size of 20 μm from Example 3. To this end, the two parts for bonding were heated to about 440° C. The PEEKK powder was then applied to both surfaces for bonding and plasticized. When the surface were uniformly wetted, the parts for bonding were placed on one another and stuck together using an overlap length of 16 mm. The shear strengths were 43.7 and 48.9 N/m² (individual values for 2 measurements). The two tests showed adhesion fractures on the ceramic side.

20) An aluminum strip sample was stuck together with a small ceramic clump (HIP RBSN) as described in Example 19. The individual values of the shear strengths for three tests were 23.9; 19.6 and 24.9 N/mm². The adhesive bond remained intact during these tests, but the aluminum strip tore off at the start of the overlap.

21) FIG. 1 shows the temperature dependence of the shear strengths of bonding strips of V2A, aluminum alloy and copper bonded together using PEEKK as hot melt adhesive.

The test pieces, which had the dimensions indicated in Example 2, were tested at various temperatures. It is found that the shear strengths of the individual metal/metal bonds remain virtually constant up to 200° C.

I claim:

1. A hot melt adhesive based on a polyarylene ether ketone of the formula

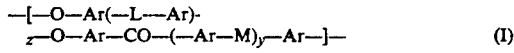

$$-[-O-Ar(-L-Ar)_{x}-O-Ar-CO-(-Ar-M)_{y}-Ar-]-  \quad (I)$$

in which Ar is an aromatic group and, in each case independently of one another, is a phenylene, diphenyl or naphthylene group, L or M is in each case —O— or —CO— and x and y independently of one another are zero or 1, 2, 3 or 4, the ether/ketone ratio is between the values 0.5 and 2 and the melt flowability (MVI 400/10 min) is 2 to 250.

2. A hot melt adhesive as claimed in claim 1, wherein the flowability MVI is 2 to 100.

3. A hot melt adhesive as claimed in claim 1, wherein the ether/ketone ratio is 0.66 to 1.

4. A hot melt adhesive as claimed in claim 1, wherein the polyarylene ether ketone has the PEK, PEEKK or PEKEKK structure.

5. A hot melt adhesive as claimed in claim 1, in which the polyarylene ether ketone is a copolyester ketone which is composed of two or more recurring EK, EEKK, EKEKK and EKK units.

6. A hot melt adhesive as claimed in claim 1, wherein mixtures of the polyarylene ether ketones are present.

7. A hot melt adhesive as claimed in claim 1, wherein up to 5 mol% of the ether groups have been replaced by thioether groups.

8. A hot melt adhesive as claimed in claim 1, wherein the hot melt adhesive contains fillers and/or reinforcing materials.

9. A hot melt adhesive as claimed in claim 1, which is in the form of powder, granules, films and fibers.

10. A composite composed of metallic, ceramic and polymer substrates produced using a hot melt adhesive as claimed in claim 1.

11. A composite as claimed in claim 10, wherein the substrates are composed of steel, aluminum, copper, ceramic, glass and/or plastic.

12. A composite as claimed in claim 10, wherein the composites are composed of steel or steel/ceramic.

* * * * *